Figure 1:
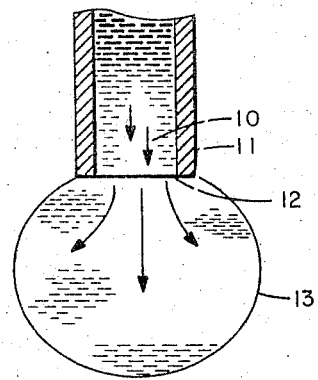

JOSEPH G. SAVINS
WILLIAM R. FOSTER   INVENTORS

BY Frederick E. Dumoulin

ATTORNEY

Dec. 13, 1966  J. G. SAVINS ETAL  3,291,211
CEMENTING OF WELLS IN AN EARTH FORMATION
Filed Sept. 11, 1963  2 Sheets-Sheet 2

WILLIAM R. FOSTER
JOSEPH G. SAVINS  INVENTORS:

BY Frederick E. Dumoulin

ATTORNEY

3,291,211
CEMENTING OF WELLS IN AN EARTH FORMATION

Joseph G. Savins and William R. Foster, Dallas, Tex., assignors to Mobil Oil Corporation, a corporation of New York
Filed Sept. 11, 1963, Ser. No. 308,223
15 Claims. (Cl. 166—22)

This invention relates to cementing and relates more particularly to cementing of a well in a subterranean formation.

For various purposes, wells are drilled from the surface of the earth to a subterranean formation. Thus, for example, wells are drilled to subterranean formations to produce and recover a fluid such as water, gas, or oil from the formations. In the drilling of such wells by the rotary method, a drilling mud is pumped from the surface of the earth through the drill pipe to the drill bit. The drilling mud then flows upwardly from the drill bit through the well between the drill pipe and the wall of the well to the surface of the earth. The drilling mud performs various functions, the most important of which is carrying the cuttings from the drilled formation out of the well. Usually, the drilling mud is thixotropic, i.e., it increases in gel strength when quiescent and decreases in gel strength when agitated. With the drilling mud being thixotropic, the cuttings may be readily separated therefrom at the surface of the earth upon emergence from the well. Further, in the event circulation of the drilling mud is stopped for any reason, the cuttings will be suspended by the drilling mud within the well and not sink to the bottom thereof with resultant danger of the drill pipe becoming stuck. The thixotropic properties of a drilling mud are ordinarily imparted thereto by employing as one of the constituents thereof a swelling clay such as bentonite.

In order to prevent entry into the well of a fluid from a formation other than the desired producing formation after the well has been completed, the well is provided with a casing extending to the desired producing formation. The casing is cemented in place, and a sheath to isolate the desired producing formation from other formations is provided, by pumping a cement slurry upwardly from the bottom of the casing through the annulus between the outer surface of the casing and the wall of the well. After the cement has set, the casing and the cement sheath in the annulus are perforated to the producing formation. Thus, fluid can pass from the desired producing formation into the casing, but fluid from other formations cannot pass into the casing.

In this cementing operation in a well, difficulty is often encountered as the result of drilling mud employed during the drilling operation remaining within the well. The mud will be present in the casing and in the annulus between the casing and the wall of the well. The annulus may be of relatively small volume where no problem has been encountered during the drilling operation in maintaining gauge, i.e., drilling the well at substantially the diameter of the drill bit. On the other hand, washouts may occur during the drilling operation whereby substantially large cavities or enlargements are formed along the wall of the well. Furthermore, the drilling mud, by virtue of being thixotropic and remaining quiescent in the well following completion of drilling, will attain considerable gel strength. Thus, the well may contain a relatively large volume of drilling mud having a high gel strength. This mud must be displaced from the localities where the cement is to be placed. Failure to displace the mud results in a poor bond between the cement and the outer surface of the casing and the wall of the well, permitting leakage of fluid to occur. Further, failure to displace the mud results in channeling of the cement through the gelled drilling mud with the result that islands of mud providing flow spaces for leakage of fluid remain in the cement after it has set. Accordingly, in cementing operations in a well, it is highly desirable to effect a substantially complete removal of the gelled drilling mud prior to placing the cement slurry in the well.

It is an object of this invention to provide a method for cementing a well in a subterranean formation.

It is another object of this invention to improve the bond between cement and the surface of casing and the wall of a well.

It is another object of this invention to avoid the effects due to channeling of cement in gelled drilling mud in a well.

It is another object of this invention to provide a method for displacing drilling mud from a well prior to cementing.

These and further objects of the invention will become apparent from the following detailed description.

In accordance with the invention, there is provided a method which involves as its essential step passing into a well, prior to placing a cement slurry therein, a liquid comprising a solvent containing dissolved therein a solute which imparts viscoelastic properties to the liquid.

Figure 2:
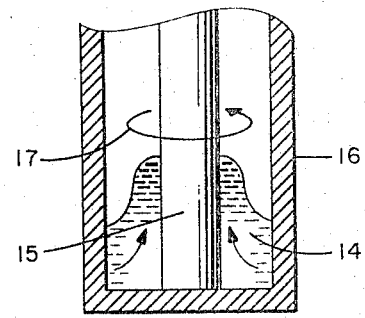
Figure 3:
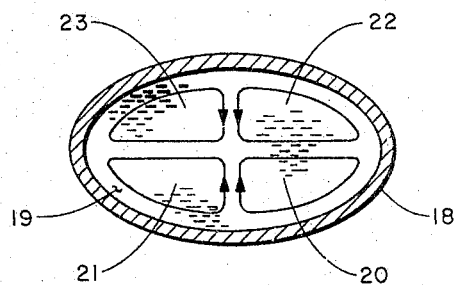

FIGURES 1, 2, and 3 are diagrammatic illustrations of certain characteristics of a viscoelastic liquid.

Figure 4:
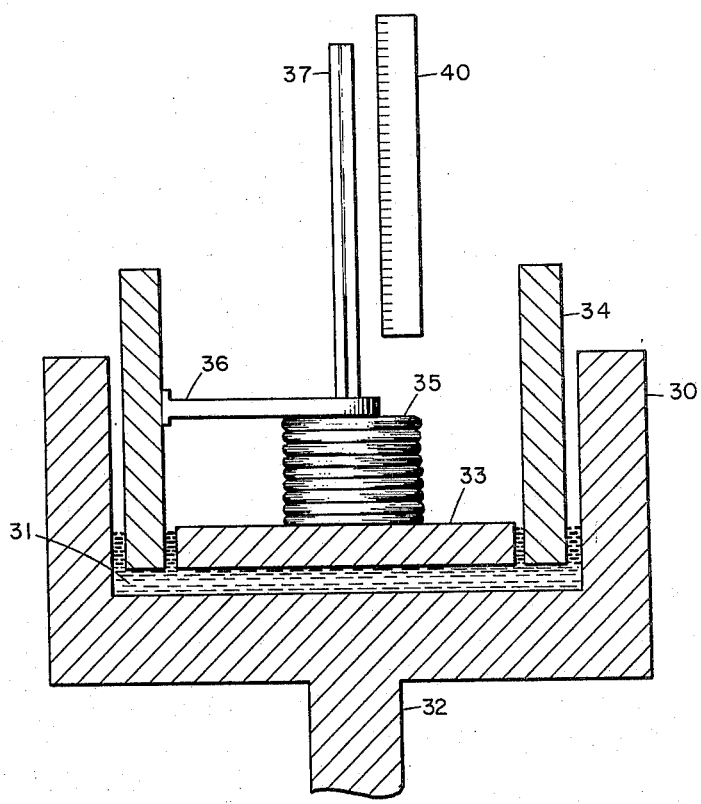

FIGURE 4 is a diagrammatic illustration of apparatus for measuring viscoelastic properties of a liquid.

The method of our invention takes advantage of the unique characteristics of a viscoelastic liquid. By "viscoelastic" liquid, we mean a liquid which possesses both elastic and viscous properties. These liquids have a characteristic viscosity function, which function may or may not be dependent on rate of shear or stress. They also exhibit elasticity of shape and a retarded elastic recovery and deformation.

In laminar flow of a viscoelastic liquid, components of stress which are normal as well as tangential to the direction of the stress frequently develop and secondary flow effects appear. Thus, the normal stresses in a viscoelastic liquid flowing in a circular conduit cause an appreciable axial tension to develop. When the flowing liquid emerges from the circular conduit, the tension in the streamlines relaxes with the result that the liquid swells to a diameter in excess of the diameter of the conduit. As a result, the liquid leaving the conduit bulges outwardly forming what might be termed an enlarged bulb at the opening of the conduit. FIGURE 1 illustrates this phenomenon. A viscoelastic liquid 10 flows through a circular conduit 11. As the liquid leaves the opening 12 of the conduit, the tension in the streamlines of the flowing liquid relaxes and the liquid swells outwardly to form the bulb 13.

Another characteristic of a viscoelastic liquid is its flow behavior between rotating concentric cylinders. Analysis of the complete spatial distribution of stress for a viscoelastic liquid in this situation shows that the primary phenomenon is the appearance of an additional tension along the streamlines. Between the rotating concentric cylinders, the streamlines are circles and the tension becomes a hoop or strangulation stress which constricts the liquid toward the axis of rotation. As a consequence, the liquid tends to climb the rotating cylinder and a pronounced thrust develops. Referring to FIGURE 2, the viscoelastic liquid 14 is positioned between inner cylinder 15 and outer cylinder 16. Inner cylinder 15 is rotated in the direction of the arrow. With rotation, the liquid 14 climbs upwardly along the rotating cylinder 15.

Further with respect to the characteristics of a viscoelastic liquid, it can be shown by theoretical analysis that flow in rectilinear paths through conduits of arbitrary cross section under a constant pressure gradient is not always possible for certain of these liquids. Thus, if the conduit is slightly elliptical, superimposed onto the simple rectilinear motion, is a steady motion in which the liquid particles follow spiral paths to develop a vortex-like motion. This is illustrated in FIGURE 3. With reference to FIGURE 3, conduit 18 is elliptical. The viscoelastic liquid 19 flows through the conduit and the fluid particles follow the spiral paths 20, 21, 22, and 23 in cross-sectional planes.

Each of the properties of a viscoelastic liquid described above is of value in displacing the gelled drilling mud in the well. With the development of axial tension of the viscoelastic liquid upon flow in a conduit, the resulting bulging effect enables the viscoelastic liquid to displace the gelled mud from cavities formed by a washout or otherwise within the well. The development of tension along the streamline of flow of the viscoelastic liquid and the development of thrust of the liquid will additionally effect displacement of the gelled drilling mud. In the latter case, it is assumed that the casing will tolerate some angular velocity of the viscoelastic liquid. Furthermore, the development of vortexlike motion in the flow of a viscoelastic liquid in a noncircular conduit, such as in an annulus where a washout or an irregularity has occurred, effects a thorough mixing of the viscoelastic liquid with the gelled mud and displacement of the gelled mud by the viscoelastic liquid. As a consequence, by passing the viscoelastic liquid into the well between the casing and the wall of the well prior to passing the cement into the well, an effective and substantially complete removal of the gelled drilling mud occurs. Consequently, an effective bonding of the cement between the casing and the wall of the well is effected whereby leakage of fluid between the cement and the casing and between the cement and the wall of the well is avoided. Additionally, with complete removal of the mud, channeling of the cement to form paths for flow of fluid through the cement is eliminated.

Viscoelastic properties can be inferred from any one of a variety of experimental techniques, including (1) the jet expansion or jet thrust method, (2) the oscillatory Couette shear method, or (3) the torsional shear method. Such methods are well known to those skilled in the art and need not be described here. The choice of the method employed to determine the viscoelastic properties of a liquid will depend upon a number of factors, including the level of detectable elastic properties, convenience and ease of measurement, the manner of theoretical analysis preferred, and the choice of interpretative procedure. The method of torsional shear is ordinarily satisfactory. The apparatus of FIGURE 4 employs this method. As shown in FIGURE 4, the apparatus is a parallel plate device. The apparatus is provided with a cup 30 and the liquid 31 whose viscoelastic properties are to be measured is placed in the cup. The cup 30 is rotatable at a constant angular velocity within the range of 75–600 revolutions per minute through shaft 32 attached to a motor drive (not shown). Preferably, the cup is rotated at a velocity below which centrifugal force effects occur. A stationary disc 33 is held concentrically and parallel to and above the cup at a distance of a few millimeters. Interposed between the cup 30 and the disc 33 is a stationary coaxial cylinder 34 which serves to minimize edge effects on the disc from centrifugal forces. A force transducer 35, in this instance a bellows, is affixed to the top of the disc 33. A clamp 36 holds the bellows in position. A capillary tube 37 is connected to the bellows, and the bellows and the tube are filled with distilled water containing a small quantity of dye to make the water in the capillary readily observable. A scale 40 indexed in units of stress is provided. Force imposed upon the bellows by movement of the disc 33 results in movement of the column of water in the capillary. The compliance of the bellows is chosen such that a small force registered on the base of the disc 33 will cause a large displacement of the level of the meniscus of the water in the capillary without significant alteration in the deflection of the disc. This is necessary in order that the distance between the bottom of the cup 30 and the lower face of the disc 33, and hence the shear conditions within the gap between the bottom of the cup and the lower face of the disc upon rotation of the cup remains constant. After the free surface of the liquid has attained equilibrium, the level of the meniscus within the capillary is noted and, if necessary, adjusted to zero thrust reading by adding or withdrawing water through the capillary with a fine hypodermic needle and syringe. The cup 30 is then set in rotation and the height of rise of the liquid thread in the capillary is recorded. The scale reading corresponding to the level of the meniscus gives the stress developed by the viscoelastic liquid against the disc 33. This in turn is taken as a measure of the degree of viscoelasticity of the liquid. It is preferred that the solution having viscoelastic properties employed in the method of the invention have a viscoelasticity such that a normal stress of at least 2000 dynes per square centimeter is developed on the face of the stationary disc.

The solvent for preparing the liquid having viscoelastic properties may be water or may be a nonaqueous solvent. The nonaqueous solvent may be one which is miscible with water or one which is immiscible with water. Further, this solvent may be one which is miscible with oil or immiscible with oil.

Drilling muds for use in the drilling of a well may have an aqueous base or oil base. In aqueous-base drilling muds, the liquid phase of the mud is water or an emulsion of oil in water, i.e., the oil is dispersed in the water. In oil-base drilling muds, the liquid phase of the mud is oil or an emulsion of water in oil, i.e., the water is dispersed in the oil. Where the drilling mud employed for drilling the well has an aqueous base, it is preferred that the solvent for preparing the liquid having viscoelastic properties be miscible with water. Thus, the solvent can be water or a liquid which is miscible with water. On the other hand, where the drilling mud employed for drilling the well has an oil base, it is preferred that the solvent be miscible with oil. Thus, the solvent can be an oil or a liquid which is miscible with oil.

In the practice of the invention, aqueous solutions of various types of solutes which will impart viscoelastic properties to the solution may be employed. For example, an aqueous solution of a high molecular weight cellulose derivative such as carboxymethyl cellulose or hydroxyethyl cellulose may be employed. Carboxymethyl cellulose having a molecular weight of about $3 \times 10^5$ is satisfactory. Hydroxyethyl cellulose having a molecular weight between about $2.5 \times 10^5$ and $3.5 \times 10^5$ is satisfactory. An aqueous solution of a high molecular weight sulfonated polystyrene may also be employed. Polyethylene oxide may also be employed as a solute for imparting viscoelastic properties to an aqueous solution. For example, solutions of polyethylene oxide having a molecular weight in the neighborhood of about one million gave satisfactory results. Water soluble copolymers such as anionic polyelectrolytes containing a significant mol fraction of nonionic water soluble repeating units, and complexes or association products comprised of a water soluble polymer and a multivalent cation, e.g., water soluble anionic polyelectrolytes containing solubilizing groups other than the ionizing species, wherein the mol fraction of the latter in the copolymer is generally less than 0.50, can also be employed. Other such aqueous solutions that may be employed include water solutions of high molecular weight polyacrylamides, a high molecular weight homopolymer of acrylamide, partially hydrolyzed polyacrylonitriles, copolymers of sodium acrylate and acrylamide, (preferably wherein the mol fraction of acrylate is at least 0.28, and the remainder is acrylamide), natural gums including the seed derivatives (guar, locust beans), and seaweed derivatives (alignates). Solutions of soaps of long-chain fatty acids, their sulfates and sulfonates, containing an excess of common ion, exhibit highly viscoelastic behavior. There is an effect of chain length of soap on viscoelastic properties such that optimum elastic behavior occurs when the soap chain contains between 12 and 18 carbon atoms, preferably about 16 carbon atoms. Examples of this class include sodium and potassium oleates, potassium laurate, sodium palmitate, sodium oleyl sulfate, sodium elaidate, and the amine oleates, each in the presence of an excess of common ion. In each of these, the solute may be in the amount of 0.1 percent by weight of the solvent up to the amount limited by pumpability of the solution. The preferred amount of solute is between 1.0 percent and 5.0 percent by weight of the solvent.

Various types of hydrocarbon solvents and various types of solutes to impart viscoelastic properties to the solutions may be employed. For example, diesel oil containing dissolved therein a soap of a fatty acid may be employed. Suitable soaps of fatty acids include aluminum octoate, aluminum laurate, and aluminum stearate. Where diesel oil, or other liquid hydrocarbon, containing a dissolved soap of fatty acid is employed, satisfactory viscoelastic properties are imparted to the solution by employing 0.2 percent or more of the fatty acid soap by weight of the solvent. Preferably, the fatty acid soap should be employed in an amount between 1.0 and 5.0 percent by weight of the hydrocarbon solvent. The upper limit of the amount of soap employed is imposed by the pumpability of the solution.

Other hydrocarbon solutions of other solutes imparting viscoelastic properties to the solution may also be employed. For example, decalin containing dissolved polyisobutylene may be employed. Another such solution involves butyl acetate or monochloro benzene as a solvent for high molecular weight poly (methyl) methacrylate. Poly (methyl) methacrylate having a molecular weight of about $10^6$ is satisfactory. A mixture of pyridine and water, preferably in the ratio of 70 parts pyridine to 30 parts water, may be employed with poly (methyl) methacrylate. Each of these latter solutions may contain from 0.2 to 10 percent or more of the solute by weight of the solvent.

In the practice of the invention, the liquid having viscoelastic properties is passed into the well as a body or slug, of the liquid. The amount of the liquid in the body, or slug to be employed will depend upon the volume of space between the casing and the wall of the well from which the drilling mud is to be displaced. Where the thickness of the formation and thus the length of the casing is small, the annular space between the liner and the well will also be small. In this situation, an amount of liquid of 1 to 2 barrels may be sufficient. On the other hand, an amount of liquid as much as 50 barrels may be required. Where the thickness of the formation and the length of the casing and consequently the volume of the annulus becomes greater, larger amounts of the viscoelastic liquid may be required.

It is preferred that the slurry of cement be pumped into the annulus between the casing and the wall of the well directly after displacement of the gelled drilling mud by the liquid having viscoelastic properties. Whereas the gelled drilling mud has a high gel strength and thus is not readily displaced by the cement, the liquid having viscoelastic properties selected for this purpose will not possess thixotropic properties. Furthermore, it is well known that the pressure necessary to pump viscoelastic systems generally is appreciably lower than that required to pump the carrier fluid when the voscoelastic system is pumped under turbulent flow conditions. It is possible that, in certain sections which are particularly irregular due to washouts or otherwise, the viscoelastic solution will be flowing under turbulent conditions. Another well known characteristic of such systems is that the flow rate oftentimes becomes sensibly independent of the applied pressure gradient under laminar conditions, particularly if the viscoelastic solution exhibits high apparent viscosities. This effect will be particularly advantageous in those regions where the channel formed by the wall of the well and the outer surface of the casing is uniform and close to gauge. Thus the viscoelastic solution is readily ejected from the annulus by the cement slurry. Moreover, such viscoelastic solutions tend to move as cohesive entities and to withstand well bore pressures without breaking apart. As a result, the cement is enabled to contact directly the wall of the well and the outer surface of the casing. Further, there is no viscoelastic solution remaining in the annular space to provide flow chanels after setting of the cement.

Having thus described our invention, it will be understood that such description has been given by way of illustration and example and not by way of limitation, reference for the latter purpose being had to the appended claims.

We claim:

1. In a process for cementing casing in a well in the earth wherein a cement slurry is placed within the annulus between said casing and the wall of said well and permitted to set therein, said well having been drilled employing a drilling mud containing a liquid phase and a solid constituent and a cake of gelled drilling mud remains within said annulus following the drilling operation in said well, the steps comprising:

(a) removing said cake of gelled drilling mud from said annulus to thereby effect contact of the wall of said well and the outer surface of said casing with said cement slurry by passing into said annulus a liquid having viscoelastic properties whereby said liquid displaces said cake of gelled drilling mud from within said annulus, and (b) thereafter passing into said annulus said cement slurry and permitting said cement slurry to set within said annulus.

2. The process of claim 1 wherein said liquid having viscoelastic properties is a solution comprising a liquid and a solute therein which imparts viscoelastic properties to said solution.

3. The process of claim 2 wherein said liquid in said solution of solute which imparts viscoelastic properties to said solution is miscible with the liquid phase contained in the drilling mud employed during the drilling of said well.

4. The process of claim 2 wherein said solution having viscoelastic properties has a viscoelasticity sufficient to develop a normal stress of at least 2000 dynes per square centimeter upon the imposition of a torsional shear to said solution.

5. The process of claim 2 wherein the amount of said solution passed into said well is at least 1 barrel.

6. The process of claim 1 wherein said liquid phase contained in said drilling mud is an oil and said liquid having viscoelastic properties is a solution comprising an oil miscible with said oil contained in said drilling mud as said liquid phase and a solute which imparts viscoelastic properties to said solution.

7. The process of claim 6 wherein said solution is a solution of a soap of a fatty acid in diesel oil.

8. The process of claim 6 wherein said solution is a solution of aluminum octoate in diesel oil in the amount between 0.1 and 5.0 percent by weight of said diesel oil.

9. The process of claim 1 wherein said liquid phase contained in said drilling mud is water and said liquid having viscoelastic properties is a solution comprising a liquid miscible with said water contained in said drilling mud as said lquid phase and a solute which imparts viscoelastic properties to said solution.

10. The process of claim 9 wherein said solution is an aqueous solution of carboxymethyl cellulose.

11. The process of claim 9 wherein said solution is an aqueous solution of carboxymethyl cellulose having a molecular weight of about $3 \times 10^5$ in an amount between 0.1 and 2.0 percent by weight of said water.

12. The process of claim 9 wherein said solution is an aqueous solution of hydroxyethyl cellulose having a molecular weight between about $2.5 \times 10^5$ and $3.5 \times 10^5$ in an amount between 0.1 and 2.0 percent by weight of said water.

13. The process of claim 9 wherein said solution is an aqueous solution of polyethylene oxide having a molecular weight of at least 1 million.

14. The process of claim 9 wherein said solution is an aqueous solution of an association product comprised of a water-soluble polymer and a multivalent cation.

15. The process of claim 1 wherein the amount of said liquid passed into said well is at least 1 barrel.

References Cited by the Examiner
UNITED STATES PATENTS

| | | | |
|---|---|---|---|
| 3,044,550 | 7/1962 | Eilers | 166—22 X |
| 3,082,823 | 3/1963 | Hower | 166—29 |
| 3,198,252 | 8/1965 | Walker et al. | 166—32 |
| 3,208,524 | 9/1965 | Horner et al. | 166—32 |

CHARLES E. O'CONNELL, *Primary Examiner.*

T. A. ZALENSKI, S. J. NOVOSAD, *Assistant Examiners.*